(12) United States Patent
Numata

(10) Patent No.: US 10,381,824 B2
(45) Date of Patent: Aug. 13, 2019

(54) CIRCUIT BREAKER WITH ARC ELIMINATOR AND POWER RECEIVING/DISTRIBUTING EQUIPMENT USING SAME

(71) Applicant: Mitsubishi Electric Corporation, Chiyoda-ku, Tokyo (JP)

(72) Inventor: Shinichi Numata, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 241 days.

(21) Appl. No.: 15/300,190

(22) PCT Filed: Apr. 24, 2015

(86) PCT No.: PCT/JP2015/062474
§ 371 (c)(1),
(2) Date: Sep. 28, 2016

(87) PCT Pub. No.: WO2015/178160
PCT Pub. Date: Nov. 26, 2015

(65) Prior Publication Data
US 2017/0179711 A1 Jun. 22, 2017

(30) Foreign Application Priority Data
May 21, 2014 (JP) .................. 2014-104802

(51) Int. Cl.
*H02H 7/22* (2006.01)
*H01H 79/00* (2006.01)
(Continued)

(52) U.S. Cl.
CPC ............ *H02H 7/222* (2013.01); *H01H 79/00* (2013.01); *H02B 11/167* (2013.01); *H02B 13/025* (2013.01); *H02B 11/28* (2013.01)

(58) Field of Classification Search
CPC ........ H02H 7/222; H01H 79/00; H02B 11/02; H02B 11/167; H02B 11/28; H02B 13/025
(Continued)

(56) References Cited

U.S. PATENT DOCUMENTS

| 2010/0133080 A1 | 6/2010 | Jeong et al. |
| 2010/0208416 A1 | 8/2010 | Shoda et al. |

(Continued)

FOREIGN PATENT DOCUMENTS

| CN | 102324339 A | 1/2012 |
| JP | 60-135007 U | 9/1985 |

(Continued)

OTHER PUBLICATIONS

Machine translation of Matsuno et al Japanese Patent Document JP 2008-283734 A Nov. 20, 2008 (Year: 2008).*

(Continued)

*Primary Examiner* — Kevin J Comber
(74) *Attorney, Agent, or Firm* — Buchanan Ingersoll & Rooney PC

(57) ABSTRACT

Power receiving/distributing equipment is composed of a switchgear incorporated for each major electric path section, wherein, when arc fault occurs on an electric path to which a circuit breaker is connected, a high-speed closing device closes to detour arc current so as to flow to a ground conductor, thereby eliminating arc at a fault electric path portion. The high-speed closing device is connected to one pole or both poles of a breaking portion of the circuit breaker, and is incorporated into an insulating support member on a corresponding pole electric path so as to be able to be drawn as a whole.

6 Claims, 6 Drawing Sheets

(51) Int. Cl.
*H02B 11/28* (2006.01)
*H02B 11/167* (2006.01)
*H02B 13/025* (2006.01)

(58) Field of Classification Search
USPC .......................................................... 361/115
See application file for complete search history.

(56) References Cited

U.S. PATENT DOCUMENTS

| | | | |
|---|---|---|---|
| 2010/0219162 | A1 | 9/2010 | Gentsch |
| 2010/0258532 | A1* | 10/2010 | Miller .................. H02B 13/025 |
| | | | 218/157 |
| 2011/0174780 | A1 | 7/2011 | Nitert et al. |
| 2013/0020182 | A1* | 1/2013 | Bozek .................... H02B 11/26 |
| | | | 200/50.21 |

FOREIGN PATENT DOCUMENTS

| | | |
|---|---|---|
| JP | 7-241007 A | 9/1995 |
| JP | 8-205342 A | 8/1996 |
| JP | 08-205342 A | 8/1996 |
| JP | 2008-283734 A | 11/2008 |
| JP | 2010-193655 A | 9/2010 |
| JP | 2012-503967 A | 2/2012 |
| JP | 5254340 B2 | 8/2013 |
| KR | 10-2010-0063556 A | 6/2010 |
| KR | 10-2010-0094944 A | 8/2010 |

OTHER PUBLICATIONS

Office Action (First Office Action) dated Nov. 1, 2017, by the State Intellectual Property Office (SIPO) of the People's Republic of China in corresponding Chinese Patent Application No. 201580025292.7, and an English Translation of the Office Action. (14 pages).
International Search Report (PCT/ISA/210) dated Jul. 14, 2015, by the Japan Patent Office as the International Searching Authority for International Application No. PCT/JP2015/062474.
Written Opinion (PCT/ISA/237) dated Jul. 14, 2015, by the Japan Patent Office as the International Searching Authority for International Application No. PCT/JP2015/062474.
Medium voltage products—Catalogue TK541/03 UFES S3—Speed, Safety, Savings, (Germany), ABB AG, 2012, pp. 6-33.
Office Action (Reason for Rejection) dated Jun. 20, 2017, by the Korean Patent Office in corresponding Korean Patent Application No. 10-2016-7026880 and English translation of the Office Action. (8 pages).

* cited by examiner

CIRCUIT BREAKER WITH ARC ELIMINATOR AND POWER RECEIVING/DISTRIBUTING EQUIPMENT USING SAME

TECHNICAL FIELD

The present invention relates to: a circuit breaker provided with arc eliminator (fault arc elimination device) that is capable of, upon arc fault such as ground fault or short circuit caused in a low-voltage, medium-voltage, or high-voltage switchgear, swiftly grounding the electric path on which the fault occurs, so that fault current flows to the ground; and power receiving/distributing equipment using the circuit breaker provided with arc eliminator.

BACKGROUND ART

Low-voltage, medium-voltage, or high-voltage power receiving/distributing equipment is an equipment system essential as a social infrastructure of power supply-demand for buildings, factories, and the like, and safety and reliability thereof are sufficiently considered for, as well as the manufacturers, the overall range including installation work and operation maintenance. However, although in very rare cases, the insulation function for the electric path might be lost due to, for example, device damage by unexpected entry of a small animal or a foreign material, insulation deterioration due to aging, great earthquake beyond the assumptions, whereby fault such as ground fault or short circuit can occur.

In particular, in internal short circuit fault of a closing device such as a switchgear, a large-current arc occurs to cause a plasma state at about 10,000 to 20,000 degrees Celsius in the vicinity of the arc. Thus, metals and insulating materials around there are partially evaporated and an insulating gas such as air around the arc instantaneously expands to make an extremely high pressure inside the device. In the case of providing a pressure releasing device for a switchgear or the like, the high-pressure insulating gas together with the evaporated metal gas and insulating material decomposed gas is pressure-released at once in a safe direction to outside of the device in about 10 milliseconds, thereby preventing breakage of the switchgear.

Thereafter, the large-current arc is continuously generated as long as the fault continues, so that the surrounding metals such as conductors and a housing are further melted and evaporated, whereby damages to the device and the like are expanded. Even in the case where the inside of the switchgear is partitioned per electric path section by metallic shielding plates as in a metal-clad switchgear, if the fault arc continues for a long time, the range of the damaged section and the damaged switchgear expands due to deformation, melting, or the like of the metal partition wall, resulting in significant damage.

Normally, the design is made such that a power circuit breaker provided for protecting each electric path eliminates such fault in the power receiving/distributing system. However, it takes at least about 100 milliseconds or longer from detection of the fault until the fault electric path is separated from a power supply by operation of the circuit breaker and the arc fault in the equipment device is eliminated. Therefore, during this period, the device in which the fault occurs is damaged to such a great extent that the device can hardly be used again, and a long period is needed for recovering the power receiving/distributing system. During this period, power cannot be supplied. In addition, the recovery requires huge cost.

Therefore, in order to suppress the damage to a minimum level and minimize the equipment recovery period after the fault, it is effective to shorten the arc fault continuation period.

Patent Document 1 describes that fault current is detoured to flow to the ground via a ground current-conduction circuit having a much lower impedance than an arc circuit in an extremely short time of several milliseconds after occurrence of arc fault, thereby eliminating, in an extremely short time, the arc at the part where the fault occurs, and discloses a system to which this configuration is applied.

Non-Patent Document 1 is a product catalog of the invention of the above Patent Document 1, and also describes the details of the application.

According to the Non-Patent Document 1, fault current is conducted so as to detour to a ground circuit in an extremely short time of several milliseconds after occurrence of the fault, thereby eliminating the arc at the fault part. As a result, arc energy injected to the insulating air space and metals such as conductors, insulating materials, and a housing at the fault part can be minimized. Therefore, damage due to arc to the part where the fault occurs becomes extremely small, and depending on the magnitude of the arc current, the damage can be suppressed to such an extent that the equipment can be operated almost as it is after the fault and the cause of the fault have been eliminated.

In these prior art documents, a high-speed closing device (in Non-Patent Document 1, primary switching unit) which is a main device of an arc eliminator (fault arc elimination device) is a device that closes to ground fault current upon arc fault in an extremely short time of 1.5 milliseconds. This device can be individually installed while being mounted on a stationary-type or drawer-type truck between the ground and three-phase electric paths having low voltage, medium voltage, or high voltage in the device such as a switchgear, and is provided at a free space of the switchgear or, as necessary, provided by extending a specific electric path and enlarging the switchgear.

The high-speed closing device mounted on a drawer-type truck can be easily installed by removing a circuit breaker such as a preparatory circuit breaker for a line that is not normally used, and inserting the drawer-type truck on which the high-speed closing device is mounted, into the circuit breaker compartment. However, in order to apply this method, it is necessary to replace the preparatory line with the arc eliminator function, and as a result, the redundancy as the power receiving/distributing equipment is deteriorated. In addition, this high-speed closing device is configured to weld a contact when conducting the fault current, thereby performing fault current conduction until the power-supply-side circuit breaker on the fault electric path is interrupted. Therefore, the high-speed closing device is to be replaced after one operation.

CITATION LIST

Patent Document

Patent Document 1: Japanese Patent Publication No. 5254340

Non-Patent Document

Non-Patent Document 1: Medium voltage products—Catalogue TK541/03 UFES S3—Speed, Safety, Savings, (Germany), ABB AG, 2012, pp. 6-33

SUMMARY OF THE INVENTION

Problems to be Solved by the Invention

Since the conventional configuration is as described above, at the time of planning for the power receiving/distributing equipment, fault expected part of an electric path, the range of the electric path to be separated when arc fault occurs at the expected part, expediting of equipment recovery after the fault, the range in which power is stopped after the fault, and the like are considered comprehensively in advance, thus making a plan to provide the high-speed closing device at a major part. In particular, in recent power receiving/distributing equipment, in order to minimize running loss, even if fault occurs by any possibility, powers for normal electric path lines other than the fault electric path are required to be recovered early.

Therefore, for example, in the case where fault occurs on a branch electric path other than a bus electric path, if the high-speed closing device is attached only at a bus portion, damage by arc can be extremely reduced, including damage to the branch electric path portion where the fault occurs. However, depending on the magnitude of the fault current, for example, in the case of relatively small current, when the electric path portion of the fault line only needs to be cleaned and checked, and can be used again as it is to recover power, or when the electric path of the fault line needs to be repaired but the electric paths of the other lines can be used as they are to recover power, it is inevitable to stop power on the bus until the high-speed closing device attached on the bus portion is replaced.

Therefore, in order to expedite equipment recovery and power recovery and thereby reduce running loss as a whole, it is effective to provide the high-speed closing device for each electric path section.

However, in order to provide the high-speed closing device for each electric path section, it is necessary to, in a device such as a switchgear, secure spaces for providing an electric-path-side current-conduction conductor, providing the insulating space distance therefor, and providing a ground-side conductor, and in addition, a space as a working area for swiftly replacing the high-speed closing device. Thus, the size of the device such as a switchgear is enlarged.

In the case of performing additional installation to the equipment that is already operating, large-scale modification work is needed.

In replacement work after the high-speed closing device has operated due to occurrence of arc fault, it is necessary to perform work for detachment and attachment of connection portions such as a current-conduction conductor portion, a ground conductor portion, and a fixation portion and a drive signal line for the high-speed closing device, and the power stop period during this work is long.

Solution to the Problems

The present invention has been made to solve the above problem, and is to provide power receiving/distributing equipment composed of a switchgear having a circuit breaker with arc eliminator in which a high-speed closing device is embedded in an insulating support member by means such as casting or mounted inside the insulating support member, the circuit breaker with arc eliminator being configured as a drawer type and incorporated for each of major electric path sections.

Effect of the Invention

The circuit breaker with arc eliminator and the power receiving/distributing equipment using the same as described above are composed of a switchgear in which a circuit breaker with arc eliminator is provided instead of a circuit breaker according to normal protection sections divided on an electric-path-section basis. Therefore, it is not necessary to make design consideration for attaching, at each major location, a high-speed closing device which is a main device to provide an arc eliminator function in each electric path section inside the switchgear, and also, it is not necessary to secure the space therefor. Thus, power receiving/distributing equipment that has a small size and for which equipment planning can be easily made, can be obtained.

In the case of adding an arc eliminator function to a device such as a switchgear in power receiving/distributing equipment that is already operating, it is necessary to perform additional works such as providing an arc fault detection device using a sensor such as an optical fiber, and arranging a drive signal line to the high-speed closing device. However, without the need of significant modification such as adding a main circuit electric path and a switchgear housing which greatly affect the structure and the outer dimensions of the switchgear, the drawer-type circuit breaker can be replaced with the circuit breaker with arc eliminator. Thus, the equipment power stop period due to the addition modification can be shortened, whereby equipment running loss can be minimized.

In replacement after the high-speed closing device has operated when arc fault has occurred by any possibility, the replacement work can be performed with the circuit breaker drawn. Therefore, the workability is improved and the work can be finished in a short time. As a result, power of the equipment can be recovered early, and running loss can be reduced. If there is a preparatory circuit breaker with arc eliminator, replacement can be performed by using the preparatory circuit breaker with arc eliminator, thus providing an effect of further expediting power recovery.

DESCRIPTION OF EMBODIMENTS

Embodiment 1

Figure 1:
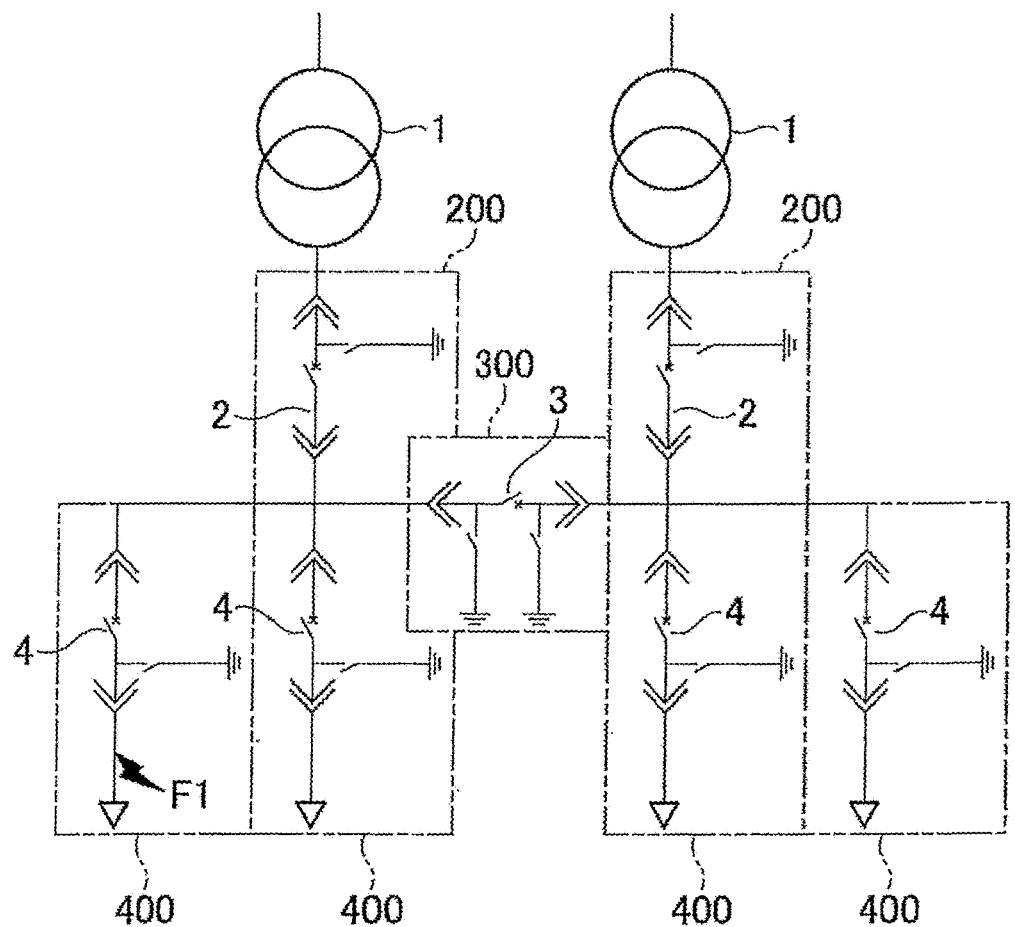
FIG. 1 is a single-line connection diagram showing an example of power receiving/distributing equipment using a circuit breaker with arc eliminator, according to embodiment 1 of the present invention.

FIG. 1 is a single-line connection diagram showing an example of a circuit breaker with arc eliminator and power receiving/distributing equipment using the same, according to embodiment 1 for carrying out the present invention, and more specifically, a single-line connection diagram showing a power distribution circuit example on the secondary side of a transformer.

In FIG. 1, 2 denotes a circuit breaker with arc eliminator (one-side type) in which a high-speed closing device for arc eliminator is mounted on one side of the breaking point of the circuit breaker so that an arc eliminator can be provided on three-phase electric paths from a transformer 1 to the breaking point of the circuit breaker. 200 denotes a switchgear on which the circuit breaker 2 with arc eliminator is mounted such that the circuit breaker 2 with arc eliminator can be inserted and detached. 3 denotes a circuit breaker with arc eliminator (both-side type) in which high-speed closing devices for arc eliminator are provided on both sides of the breaking point of the circuit breaker so that arc eliminators can be provided on three-phase electric paths on both sides of the breaking point of the circuit breaker. 300 denotes a switchgear on which the circuit breaker 3 with arc eliminator is mounted such that the circuit breaker 3 with arc eliminator can be inserted and detached. 4 denotes a circuit breaker with arc eliminator (one-side type) in which a high-speed closing device for arc eliminator is mounted on one side of the breaking point of the circuit breaker so that an arc eliminator can be provided on three-phase electric paths from the breaking point of the circuit breaker to the load side. 400 denotes a switchgear on which the circuit breaker 4 with arc eliminator is mounted such that the circuit breaker 4 with arc eliminator can be inserted and detached.

Figure 2:
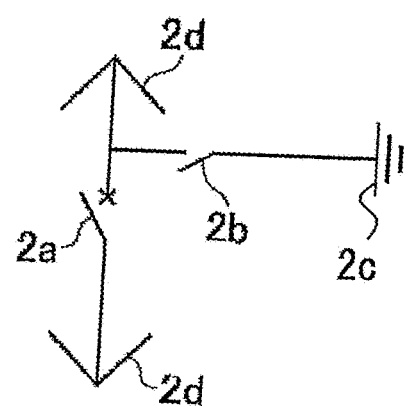
FIG. 2 is a diagram showing a single-line-diagram symbol of a circuit breaker with arc eliminator (one-side type) according to embodiment 1 of the present invention.
Figure 3:
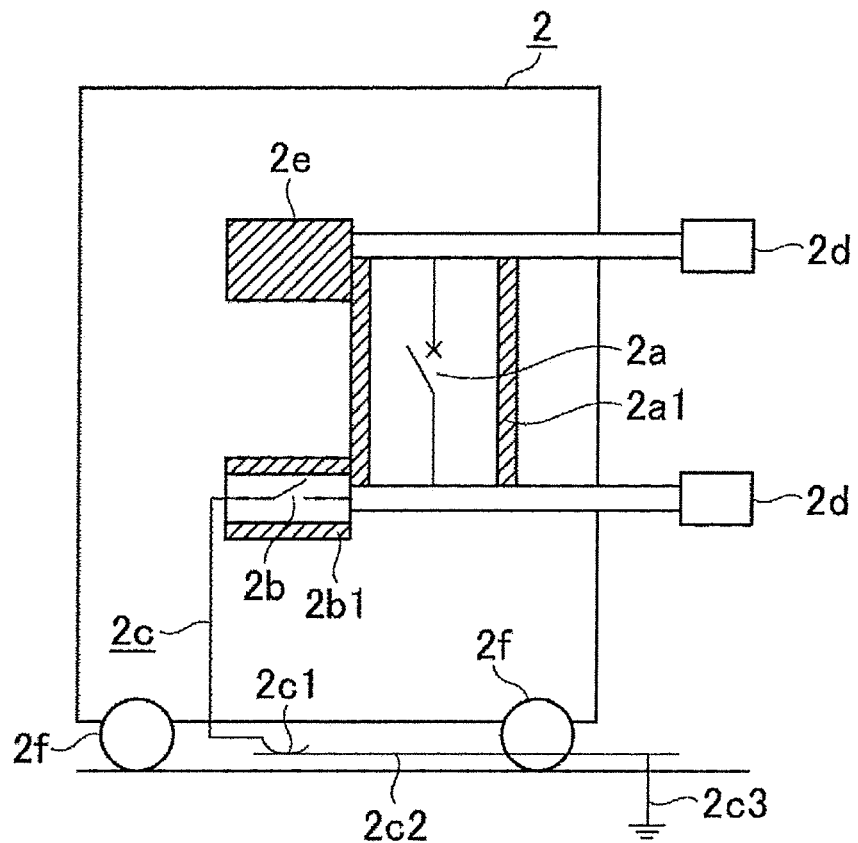
FIG. 3 is a structure conceptual diagram of the circuit breaker with arc eliminator (one-side type) according to embodiment 1 of the present invention.

FIG. 2 is a single-line-diagram symbol indicating the circuit breaker 2 with arc eliminator (one-side type). FIG. 3 is a structure conceptual diagram of the circuit breaker 2 with arc eliminator (one-side type).

In FIG. 2 and FIG. 3, 2a denotes a breaking portion, 2a1 denotes an inter-pole insulator of the breaking portion, and 2b denotes a high-speed closing device, as disclosed in, for example, Patent Document 1. The device is downsized by vacuum insulation technology exhibiting high insulation performance, and has dimensions corresponding to the insulation distance in the atmosphere. 2b1 denotes an insulator of the high-speed closing device, which is formed integrally with the high-speed closing device 2b by casting insulation, whereby electric path portions of the circuit breaker 2 such as the breaking portion 2a, the inter-pole insulator 2a1 thereof, and an insertion contact conductor 2d are insulated and strength for mechanically supporting them is ensured. As the casting insulation material, in view of mechanical strength and an electric property, a thermosetting resin such as epoxy resin is used. However, another resin or thermoplastic resin may be used. Instead of integrally forming the high-speed closing device 2b and the insulator 2b1 by casting, the insulator 2b1 for the high-speed closing device 2b may be formed as an insulating case-shaped component by casing or molding, and the high-speed closing device 2b may be attached to the inside thereof in a detachable manner. In this case, in replacement after operation of the high-speed closing device, only the high-speed closing device 2b needs to be replaced, and thus there is an advantage that the insulator 2b1 can be used again. In the case of integral casting as shown in Non-Patent Document 1, the structure is simple, but it is necessary to integrally replace and discard the high-speed closing device 2b and the insulator 2b1.

One side of the high-speed closing device 2b is electrically and mechanically connected by a fastening member such as a bolt to the electric path conductor 2d (in FIG. 3, on the lower side) connected to one pole of the breaking portion 2a. The other side of the high-speed closing device 2b is a ground conductor circuit 2c and is connected to a body ground contact 2c1 of the circuit breaker 2 with arc eliminator so that fault current is conducted from a ground conductor 2c3 of the switchgear to the ground through a ground terminal 2c2 provided to a circuit breaker compartment of the switchgear. The ground conductor circuit 2c (2c1, 2c2, 2c3) has a current-conduction capacity for short-time conduction current and current-conduction time that are compliant with the standard of switchgear or circuit breaker such as IEC (International Electrotechnical Commission), and is connected to the high-speed closing device 2b by attachable/detachable fastening means such as a bolt. Here, 2c1 and 2c2 are formed as sliding contacts.

When arc fault occurs on an electric path connected to the circuit breaker 2, the high-speed closing device 2b closes to detour the arc current to flow to the ground conductor circuit 2c, thereby eliminating the arc at the fault electric path part, and thus the high-speed closing device 2b needs to be replaced per one closing operation.

2e denotes a support insulating member which electrically and mechanically supports the other pole of the breaking portion 2b and the electric path conductor (in FIG. 3, on the upper side) 2d connected to the other pole. The outer shape and the attachment structure of the support insulating member 2e are the same as the dimensions and the attachment structure of the insulator 2b1 of the high-speed closing device. The ends (in FIG. 3, right ends) of the upper and lower electric path conductors 2d are, for example, tulip contacts configured to be able to be inserted and detached with respect to electric path terminals (not shown) of the switchgear. 2f denotes wheels provided for facilitating movement of the circuit breaker 2 with arc eliminator inside the switchgear 200 or the like.

Although not shown, a circuit breaker with arc eliminator (one-side type) in which a high-speed closing device is provided to the electric path conductor (in FIG. 3, on the upper side) connected to the other pole of the breaking portion can also be formed by only reassembling members and adding a ground-side conductor, and thus can be selected as appropriate in accordance with the configuration of the power receiving/distributing equipment.

Figure 4:
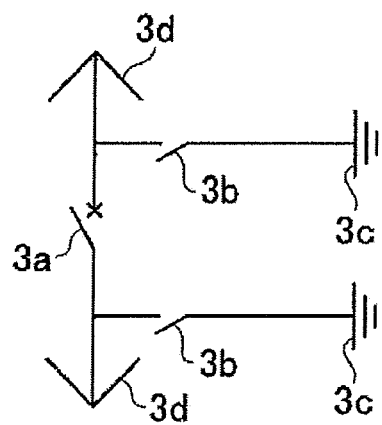
FIG. 4 is a diagram showing a single-line-diagram symbol of a circuit breaker with arc eliminator (both-side type) according to embodiment 1 of the present invention.
Figure 5:
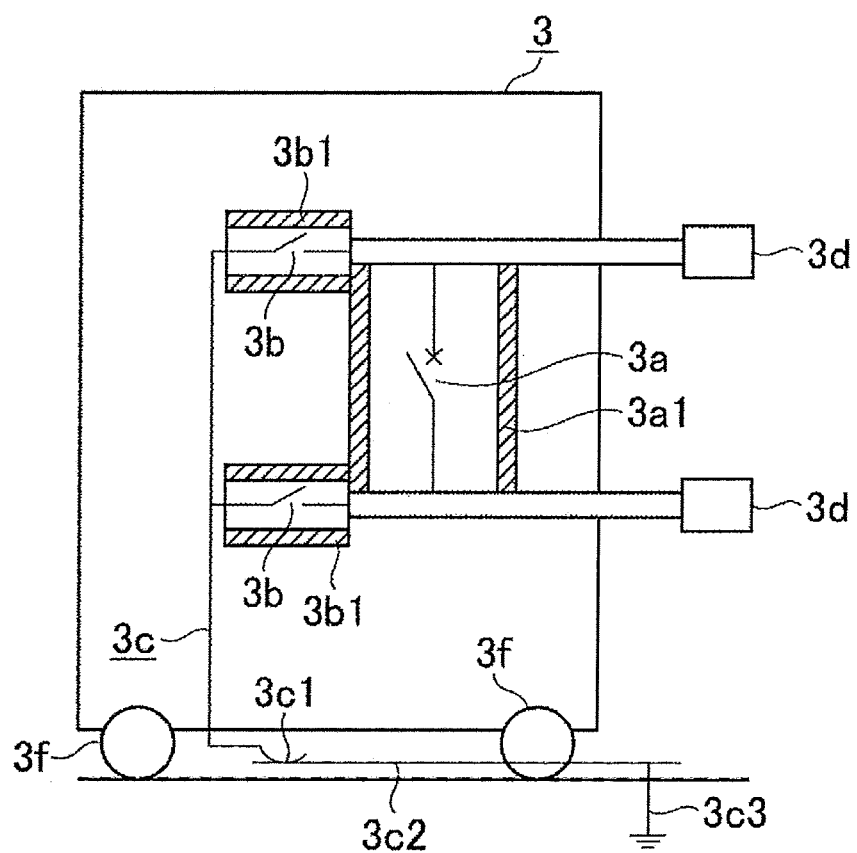
FIG. 5 is a structure conceptual diagram of the circuit breaker with arc eliminator (both-side type) according to embodiment 1 of the present invention.

FIG. 4 is a single-line-diagram symbol showing a circuit breaker 3 with arc eliminator (both-side type). FIG. 5 is a structure conceptual diagram of the circuit breaker 3 with arc eliminator (both-side type).

This circuit breaker 3 with arc eliminator is a both-pole type in which high-speed closing devices 3b are provided at both poles of a breaking portion 3a. The configuration of each part is the same as that of the one-side type described in FIG. 2 and FIG. 3, and the description thereof is omitted.

Next, application of the circuit breaker with arc eliminator will be described.

On the assumption in which, by any possibility, arc fault will occur in the power receiving/distributing equipment, a power receiving/distributing equipment plan is made so as to maximize the operation rate of the power receiving/distributing equipment until recovery from the fault. In this case, in order to minimize the power stop range and minimize the power stop period including equipment recovery work after fault when the electric path portion where occurrence of arc fault is assumed, and the corresponding electric path section, are separated from the other normal electric paths, it is necessary to make a plan for placing the switchgear 1, considering the part where a general high-speed closing device of an individual attachment type is to be placed, and considering the space and the attachment structure for placing the high-speed closing device.

However, by using the circuit breaker with arc eliminator according to the present invention, it becomes possible to provide high-speed closing devices for all the electric paths of the switchgear by only selecting the circuit breaker with arc eliminator. In the case of making a perfect plan, by applying the circuit breakers with arc eliminator to all the circuit breakers, the high-speed closing devices for arc eliminator can be provided for all the electric paths without omission.

In the case of adding an arc eliminator function to the power receiving/distributing equipment that does not have an arc eliminator function for the purpose of reducing damage upon fault and minimizing running loss, it is only necessary to replace each circuit breaker with the circuit breaker with arc eliminator.

Next, the case where fault occurs in the power receiving/distributing equipment will be described.

When arc fault (indicated by F1) occurs on an electric path in the switchgear 400 for feeder in FIG. 1, a protection system works so that a protection relay (not shown) and an arc detection device (not shown) operate to transmit a drive signal to the circuit breaker 4 with arc eliminator on the electric path, thereby separating the electric path in the fault section, and thus localizing and minimizing damage.

In a general protection system using a protection relay, a period of about 100 milliseconds at earliest elapses from occurrence of fault until the relevant circuit breaker operates to separate the fault section. In the case where large fault current flows in a circuit of the equipment having a large equipment capacity and a small fault impedance, arc energy due to the arc fault is great, and therefore, even if the fault continues during only about 100 milliseconds or even if the switchgear has such an internal arc proof structure as to allow pressure release to be performed in about ten and several milliseconds after the occurrence of fault, due to explosive increase in the pressure in the switchgear compartment, melting and evaporation of metal materials composing conductors and the compartment, burning and evaporation of insulating materials, and the like, significant damage is caused to, as well as this switchgear compartment, the adjacent switchgear compartments, the adjacent devices, and the like. However, the arc eliminator function is provided which, by operating the high-speed closing device by the arc detection device, grounds the electric path on which the fault occurs, in several milliseconds after the occurrence of arc fault, and detours the fault current to the ground circuit, thereby eliminating the fault arc, thus achieving such a switchgear that is hardly damaged even after the fault has finished.

Since it is desirable that the operation of the high-speed closing device at this time should be as quick as possible, simple structure performance that allows only one operation is used in order to achieve downsizing and high-speed operation. Therefore, the high-speed closing device 2b is to be replaced with new one after the fault is eliminated.

Since the power receiving/distributing equipment using the circuit breaker with arc eliminator according to the present invention is configured as described above, on the assumption that arc fault will occur in the power receiving/distributing equipment by any possibility, it is possible to simply and easily perform design in equipment planning for minimizing running loss in that case. In addition, it is possible to perform, in a simple manner and at low cost, modification for adding the arc eliminator function to the existing equipment. Thus, an effect of shortening the power stop period due to the equipment modification and reducing the modification cost is obtained.

Further, it is possible to easily provide the arc eliminator function with fine mesh on the entire electric paths in the power receiving/distributing equipment, without enlarging the size of the equipment.

In addition, replacement work after the high-speed closing device has operated due to occurrence of arc fault can be easily performed, and equipment recovery can be swiftly performed after the arc fault has been eliminated. Therefore, the power stop period is shortened and running loss is reduced.

Here, the case where the high-speed closing device is replaced per one operation has been shown as an example. In this case, since the replacement will be performed at a high frequency, the effect of the present embodiment can be exerted to the maximum extent. However, as a matter of course, even in the case where it is not necessary to replace the high-speed closing device per one operation, for example, the case where the high-speed closing device is to be replaced per two operations or three or more operations, the effect of the present embodiment can be obtained.

Embodiment 2

FIG. 6 to FIG. 10 show a circuit breaker with arc eliminator and power receiving/distributing equipment using the same, according to embodiment 2.

Figure 6:
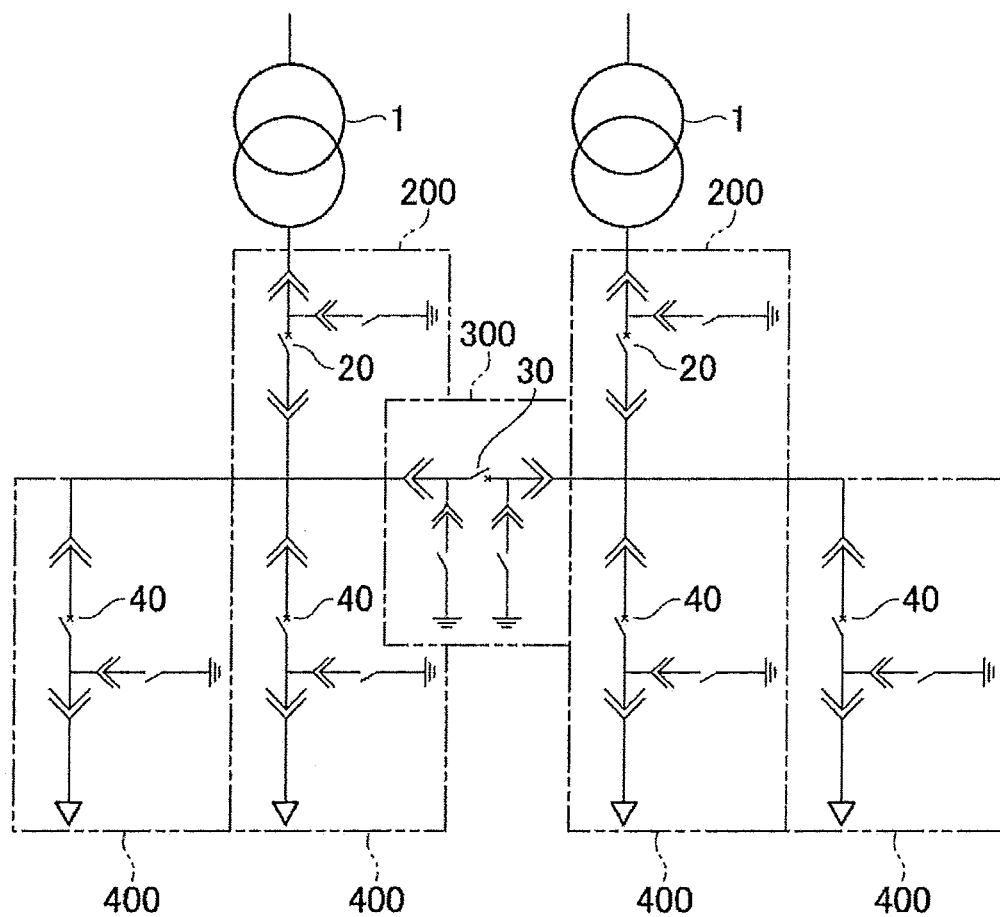
FIG. 6 is a single-line connection diagram showing an example of power receiving/distributing equipment using a circuit breaker with arc eliminator, according to embodiment 2 of the present invention.
Figure 7:
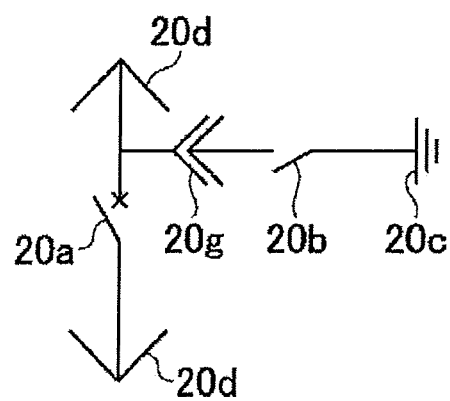
FIG. 7 is a diagram showing a single-line-diagram symbol of a circuit breaker with arc eliminator (one-side type) according to embodiment 2 of the present invention.

FIG. 6 is a single-line connection diagram showing an example of the circuit breaker with arc eliminator and the power receiving/distributing equipment using the same, according to embodiment 2 for carrying out the present invention. As shown in FIG. 7 to FIG. 10, circuit breakers 20, 30, 40 with arc eliminator according to embodiment 2 are circuit breakers with arc eliminator of a type in which the high-speed closing device is inserted, and thus are a modified type so that only the high-speed closing device portion which needs to be replaced after operation upon arc fault can be mounted and detached with respect to the circuit breaker body.

Figure 8:
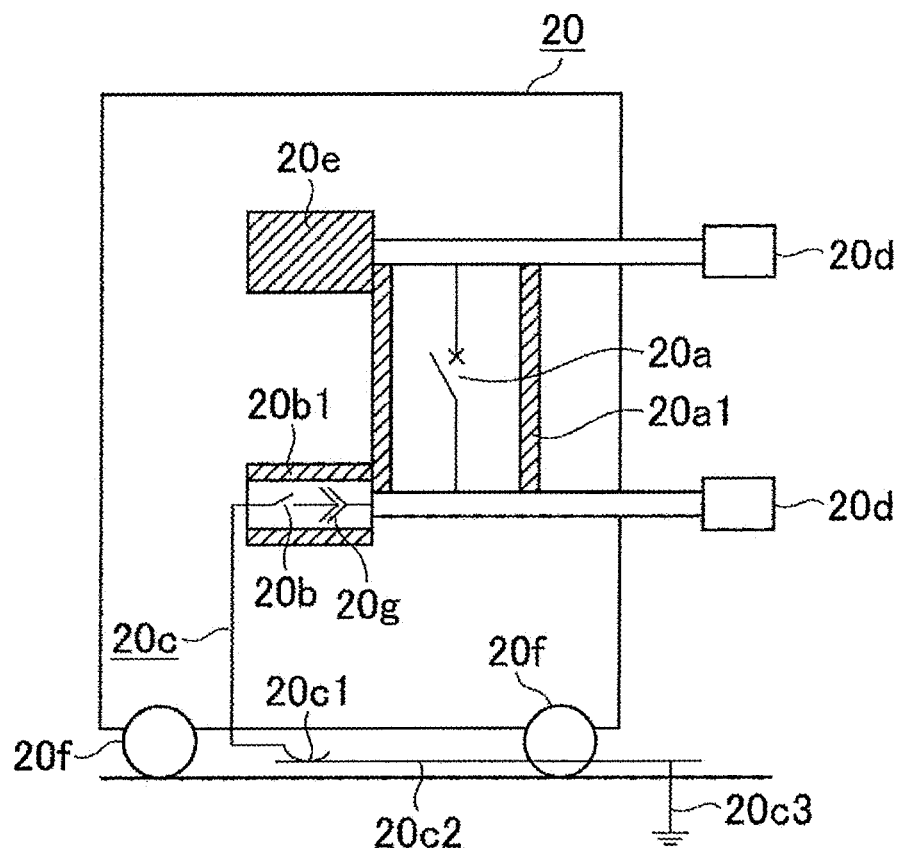
FIG. 8 is a structure conceptual diagram of the circuit breaker with arc eliminator (one-side type) according to embodiment 2 of the present invention.

20g in FIG. 8 denotes an insertion contact portion, which forms an insertion-type contact structure in which a lower electric path 20d of the circuit breaker 20 and a high-speed closing device 20b are attachable and detachable with each other as in, for example, a tulip contact. In this case, an insulator 20b1 for the high-speed closing device is formed as a cast or molded product having a case shape, instead of being integrated with the high-speed closing device 20b by casting.

Figure 9:
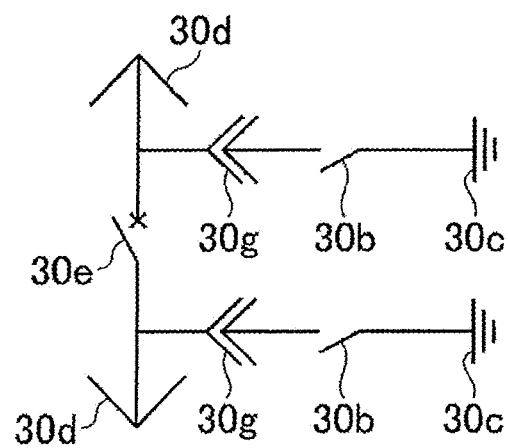
FIG. 9 is a diagram showing a single-line-diagram symbol of a circuit breaker with arc eliminator (both-side type) according to embodiment 2 of the present invention.
Figure 10:
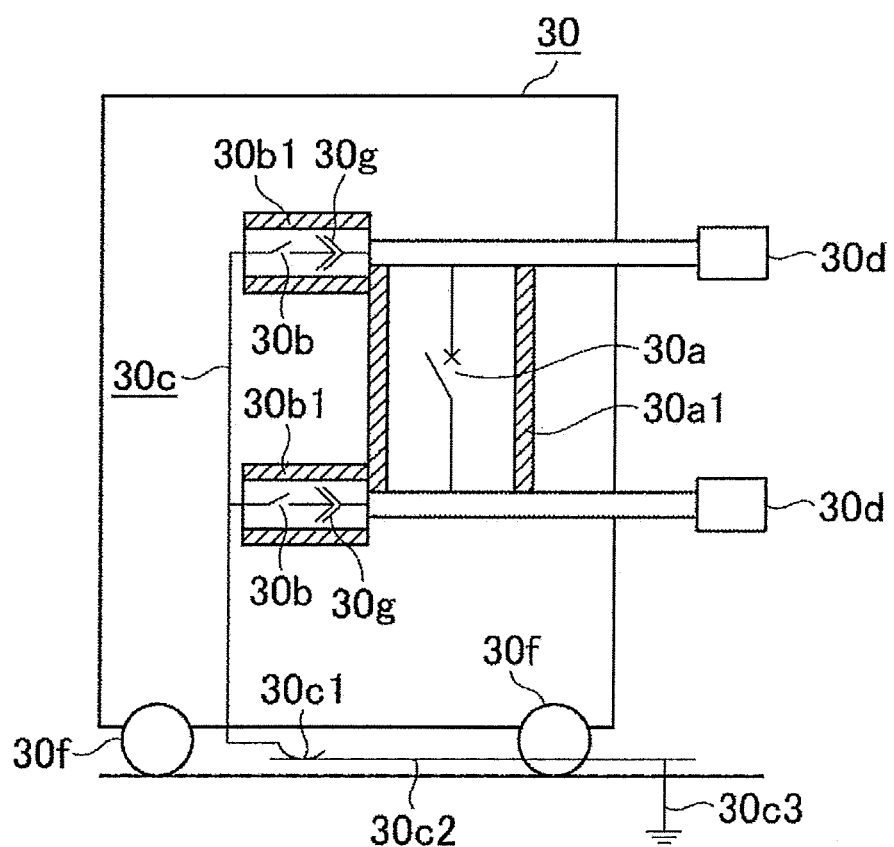
FIG. 10 is a structure conceptual diagram of the circuit breaker with arc eliminator (both-side type) according to embodiment 2 of the present invention.

An insertion contact portion 30g in FIG. 9 also has the same structure as the insertion contact portion 20g, and forms an insertion-type contact structure that allows attachment and detachment as in a tulip contact or the like. The other configuration is the same as that described in embodiment 1.

In the present embodiment 2, as compared to embodiment 1, recovery work is further facilitated, so that the power stop period for recovery is further shortened, thus providing an effect of further reducing running loss.

Embodiment 3

In the circuit breaker with arc eliminator and the power receiving/distributing equipment using the same as described in embodiment 1 and embodiment 2, the circuit breaker with arc eliminator (one-side type) and the circuit breaker with arc eliminator (both-side type) are selectively used in accordance with the electric path sections. However, all the circuit breakers may be the circuit breakers with arc eliminator (both-side type). In this case, equipment planning is further facilitated, and if the high-speed closing device at the bus portion (in FIG. 1 or FIG. 6 shown as an example, there is only one high-speed closing device for bus) has operated, another feeder circuit breaker can be used as substitute. Thus, recovery from fault is further facilitated, and an effect of shortening the power stop period in recovery is provided.

It is noted that, within the scope of the present invention, the above embodiments may be freely combined in part or whole, or each of the above embodiments may be modified or simplified as appropriate.

DESCRIPTION OF THE REFERENCE CHARACTERS 1 transformer
2 circuit breaker with arc eliminator (one-side type)
2a, 3a, 20a, 30a breaking portion
2a1, 3a1, 20a1, 30a1 inter-pole insulator of breaking portion
2b, 3b, 20b, 30b high-speed closing device
2b1, 3b1, 20b1, 30b1 insulating support member for high-speed closing device
2c, 3c, 20c, 30c ground conductor circuit
2c1, 3c1, 20c1, 30c1 ground contact
2c2, 3c2, 20c2, 30c2 ground terminal conductor (switchgear attachment)
2c3, 3c3, 20c3, 30c3 ground conductor (switchgear attachment)
2d, 3d, 20d, 30d electric path conductor
2e, 3e, 20e, 30e support insulating member
2f, 3f, 20f, 30f wheel
3 circuit breaker with arc eliminator (both-side type)
4 circuit breaker with arc eliminator (one-side type)
200, 300, 400 switchgear
20 insertion-type circuit breaker with arc eliminator (one-side type)
30 insertion-type circuit breaker with arc eliminator (both-side type)
20g, 30g insertion contact portion

The invention claimed is:

1. A circuit breaker with arc eliminator, comprising
a closing device which, when an arc fault occurs on an electric path to which the circuit breaker is connected, closes to cause arc current to detour via a body ground contact provided to the circuit breaker and flow to a ground conductor, thereby eliminating arc at a fault electric path portion, wherein
the closing device is connected to one pole or both poles of a breaking portion of the circuit breaker, and is incorporated into an insulating support member on a corresponding pole electric path,
the closing device being assembled in a detachable manner from the insulating support member with the insulating support member formed as an insulating case-shaped component by casting or molding, the closing device configured to be replaceable after use, and
the circuit breaker is formed in a drawer type as a whole.

2. The circuit breaker with arc eliminator according to claim 1, wherein
the closing device is formed integrally with the insulating support member by casting.

3. The circuit breaker with arc eliminator according to claim 1, wherein
in the closing device, a current-conduction connection portion with an electric path conductor portion of the circuit breaker has an insertion-type configuration, so as to allow the closing device to be replaced in a state in which the insulating support member formed as the insulating case-shaped component is fixed to the circuit breaker.

4. Power receiving/distributing equipment, comprising:
a switchgear having a circuit breaker with arc eliminator incorporated therein for each of major electric path sections, the circuit breaker including a closing device which, when an arc fault occurs on an electric path to which the circuit breaker is connected, closes to cause arc current to detour via a body ground contact provided to the circuit breaker and flow to a ground conductor, thereby eliminating arc at a fault electric path portion, wherein
the closing device is connected to one pole or both poles of a breaking portion of the circuit breaker, and is incorporated into an insulating support member on a corresponding pole electric path,
the closing device being assembled in a detachable manner from the insulating support member with the insulating support member formed as an insulating case-shaped component by casting or molding, the closing device configured to be replaceable after use, and
the circuit breaker is formed in a drawer type as a whole.

5. The power receiving/distributing equipment according to claim 4, wherein
the switchgear is for a bus portion and is composed of a circuit breaker with arc eliminator of both-side type in which closing devices are connected to both poles of the breaking portion of the circuit breaker, and
another switchgear is composed of a circuit breaker with arc eliminator of one-side type in which the closing device of the other switchgear is connected to one pole of the breaking portion of the circuit breaker of the other switchgear.

6. The power receiving/distributing equipment according to claim 4, wherein the switchgear is for a bus portion, and another switchgear is composed of a circuit breaker with arc eliminator of both-side type in which closing devices are connected to both poles of the breaking portion of the circuit breaker of the other switchgear.

\* \* \* \* \*